United States Patent
Deboy et al.

(10) Patent No.: US 7,005,761 B2
(45) Date of Patent: Feb. 28, 2006

(54) CIRCUIT CONFIGURATION FOR OFF-LOAD SWITCHING, SWITCH MODE POWER SUPPLY, CLOCKED SUPPLY, VOLTAGE REGULATOR, LAMP SWITCH, AND METHODS FOR OPERATING THE CIRCUIT CONFIGURATION

(75) Inventors: Gerald Deboy, München (DE); Holger Huesken, München (DE); Thomas Laska, München (DE)

(73) Assignee: Infineon Technologies AG, Munich (DE)

(*) Notice: Subject to any disclaimer, the term of this patent is extended or adjusted under 35 U.S.C. 154(b) by 68 days.

(21) Appl. No.: 10/299,772

(22) Filed: Nov. 19, 2002

(65) Prior Publication Data

US 2003/0094857 A1 May 22, 2003

Related U.S. Application Data

(63) Continuation of application No. PCT/EP01/00737, filed on Jan. 24, 2001.

(30) Foreign Application Priority Data

May 19, 2000 (DE) .......................... 100 24 859

(51) Int. Cl.
*H01H 83/00* (2006.01)

(52) U.S. Cl. .................. 307/116; 363/97; 438/202; 257/243

(58) Field of Classification Search .............. 307/116; 363/97; 438/202; 257/243
See application file for complete search history.

(56) References Cited

U.S. PATENT DOCUMENTS

| 5,331,534 A | 7/1994 | Suzuki et al. |
| 5,355,003 A | 10/1994 | Tomomatsu |
| 5,466,951 A | 11/1995 | Brunner et al. |
| 5,615,100 A | 3/1997 | Radecker et al. |
| 5,680,015 A | 10/1997 | Bernitz et al. |
| 5,960,075 A | 9/1999 | Sutherland et al. |
| 6,309,920 B1 | 10/2001 | Laska et al. |

FOREIGN PATENT DOCUMENTS

| DE | 43 26 052 A1 | 2/1994 |
| DE | 44 37 453 A1 | 4/1996 |
| DE | 197 20 439 A1 | 11/1997 |
| DE | 197 31 495 A1 | 1/1999 |
| DE | 198 29 614 A1 | 1/2000 |
| EP | 0 657 941 A2 | 6/1995 |
| JP | 06 268 206 A | 9/1994 |
| JP | 06 318 706 A | 11/1994 |
| JP | 07 045 822 A | 2/1995 |
| WO | 93/04526 | 3/1993 |
| WO | WO 94/17585 | 8/1994 |

*Primary Examiner*—Robert L. DeBeradinis
(74) *Attorney, Agent, or Firm*—Laurence A. Greenberg; Werner H. Stemer; Ralph E. Locher

(57) ABSTRACT

A circuit configuration is used for off-load switching. The circuit configuration can be used as a component in a switch mode power supply, a clocked supply, a voltage regulator, and a lamp switch, wherein the circuit configuration is embodied as an IGBT, especially a field stop IGBT or alternately and additionally as a PT IGBT. A method for using the circuit configuration include three operating modes: in a first operating mode, power for a load is modulated by pulse modulation; in a second operating mode, the power is modulated by changing a switching-on time; and, in a third operating mode, both are implemented.

34 Claims, 7 Drawing Sheets

CIRCUIT CONFIGURATION FOR OFF-LOAD SWITCHING, SWITCH MODE POWER SUPPLY, CLOCKED SUPPLY, VOLTAGE REGULATOR, LAMP SWITCH, AND METHODS FOR OPERATING THE CIRCUIT CONFIGURATION

CROSS-REFERENCE TO RELATED APPLICATION

This application is a continuation of copending International Application No. PCT/EP01/00737, filed Jan. 24, 2001, which designated the United States and was not published in English.

BACKGROUND OF THE INVENTION

Field of the Invention

The invention relates to a circuit configuration for off-load switching having an energy storage capacitor that is disposed between a first and a second supply potential and has a controllable power switch, a diode that is connected back-to-back in parallel with the load path of the power switch, and a resonant circuit that has a conductance and a capacitor.

According to the invention, a circuit configuration for off-load switching is provided that has the following features: an energy storage capacitor that is disposed between a first and a second supply potential, a controllable power switch, a diode that is connected back-to-back in parallel with the load path of the power switch, and a resonant circuit that has an inductance and a capacitor.

A circuit configuration of this generic type is described in European Patent No. EP 0 681 759 B1, which corresponds to U.S. Pat. No. 5,615,100. Circuits such as these may be, for example, in the form of switch-mode power supplies, inverters, half-bridge or full-bridge circuits, or the like. A major component of each of these circuits is a semiconductor component, in the form of a power switch, for switching the loads.

In the course of the increasing miniaturization of circuits for power electronics, and the increase in the power density associated with this, it is necessary in particular for the power switches to be operated at ever-higher switching frequencies in order in this way to achieve a further reduction in the size of passive components. An essential feature for the market success of such circuit concepts is for the power switches to have a power consumption that is as low as possible. In the case of power switches, which ideally should not consume any power at all, any power consumption is thus also referred to as a power loss.

In principle, a distinction can be drawn between two different types of power loss in semiconductor switches: firstly, the power loss during the "on phase", in which the power switch is switched on and is controlled to have a low impedance. These losses result from the voltage that is dropped by a current flowing in the channel region of the semiconductor switch and drift zone losses. Secondly, there are also switching losses, that occur as the result of the alternating process of switching the power switch on and off. These switching losses result from a high current density and a high voltage being applied to the semiconductor switch at the same time during the switching process. However, these switching losses occur only during very short time intervals, specifically only when switching on when the current is rising and then switching off while the current is decaying to zero. However, as the switching frequency rises, the switching losses become increasingly important in the overall power loss balance.

For the last-mentioned reason, development is now being aimed at circuit concepts that reduce such switching losses by suitable choice of the switching conditions. One such concept is so-called zero voltage switching (ZVS), as it is referred to in the relevant specialist literature. The corresponding circuits are also referred to as resonant circuits or as circuits for zero-voltage switching, or switching with no voltage load. In circuit configurations such as these, the semiconductor switch is switched on at a time at which no voltage, or only a small voltage, is applied to the switch.

In this case, the semiconductor switch need ideally not carry any commutation current at all from other circuit parts, as a result of which switching-on losses can be ignored in this case. When switching off in such concepts, care is taken to ensure that the voltage rise across the component is delayed such that the maximum current density and the maximum voltage never occur at the same time across the power switch.

The initially-cited European Patent No. EP 0 681 759 B1 discloses a circuit configuration such as this for switching with no voltage load. The semiconductor switch described there is in the form of a field-effect-controlled power transistor: for example, a MOSFET or a JFET. Power switches such as these have the advantage that, as unipolar components, they have virtually no flooding charge that needs to be cleared out in a manner involving losses. The switching losses of field-effect-controlled power transistors are thus very small. Semiconductor components such as these have the major disadvantage, however, that their voltage drop is high when switched on, and that the very high power loss associated with this during the "on phase", which is very much higher than in the case of bipolar semiconductor switches. This power loss is particularly significant at the high reverse voltages which are required for such circuits, and which are typically more than 800 V. This problem could be overcome by providing a larger chip area for the semiconductor switch.

However, in most cases, this is not feasible for financial reasons alone.

Unipolar power transistors that can be controlled by the field effect are thus suitable only to a limited extent, if at all, for circuit applications which need to be constructed for very high reverse voltages.

SUMMARY OF THE INVENTION

It is accordingly an object of the invention to provide a circuit configuration for off-load switching, a switch mode power supply, a clocked supply, a voltage regulator, a lamp switch, and methods for operating the circuit configuration that overcome the hereinafore-mentioned disadvantages of the heretofore-known devices and methods of this general type and that switch when there is no voltage load and whose power switch is optimized with regard to the switching conditions for high-voltage applications. Furthermore, it should be possible to operate the circuit configuration, and hence the power switch, in a stable manner, that is to say with the power loss being changed as little as possible, in particular even at relatively high temperatures.

With the foregoing and other objects in view, there is provided, in accordance with the invention, a circuit configuration for off-load switching including a first and second supply potential, an energy store capacitor, a controllable power switch, a diode, a resonant circuit, and a semiconductor body. The energy storage capacitor is disposed between the first and second supply potentials. The controllable power switch has a load path. The diode connects back-to-back in parallel with the load path of the power switch. The resonant circuit has a conductance and a capacitor. The semiconductor body holds the power switch and has a first surface, an inner zone of a first conductance type, a base zone of a second conductance type embedded in the inner zone and adjacent the first surface of the semiconductor body, an emitter zone of the first conductance type disposed in the base zone, a field stop zone of the first conductance type adjacent the inner zone and having a higher doping concentration than the inner zone, and a collector zone of the second conductance type adjacent the field stop zone.

In accordance with a further object of the invention, the resonant circuit has first and second operating phases. The first operating phase begins when the power switch just has been switched on during and then continues when the power switch is in a switched-on state. The second operating phase occurs when the power switch is switched off and the resonant circuit oscillating freely.

With the objects of the invention in view, there is also provided a method for operating the circuit configuration. In a first operating mode, the method calls for modulating power for a load by changing during the first operating phase a number of pulses, pulse width, or an interval between two pulses. In a second operating mode, the method calls for modulating the power for the load by changing a switching-on time of the power switch within the first operating phase. In a third operating mode, the method calls for modulating the power provided for the load both via changing the switching-on time of the power switch within the first operating phase and by changing during the first operating phase a number of pulses, pulse width, or an interval between two pulses.

According to the invention, a circuit configuration of this generic type is provided for off-load switching, and is characterized in that the power switch is disposed in a semiconductor body. The semiconductor body has the following features: at least one inner zone of the first conductance type, at least one base zone of the second conductance type that is embedded in the inner zone and is adjacent a first surface of the semiconductor body, at least one emitter zone of the first conductance type that is disposed in each base zone, at least one field stop zone of the first conductance type that is adjacent the inner zone and has a higher doping concentration than the inner zone, and at least one collector zone of the second conductance type that is adjacent the field stop zone.

The power switch according to the invention for a circuit configuration on which there is no voltage load is distinguished by vertical optimization of its semiconductor structure. The blocking capability of the power switch is ensured by two differently doped layers, that is to say an inner zone with low doping and a field stop zone that is very highly doped compared to the inner zone but is thin and of the same conductance type. When switched on, both the inner zone and the field stop zone are flooded by an electron-hole plasma. By suitable choice of the doping level of the inner zone, it is possible for the flooding charge to be cleared out even at low voltages. This leads to the tail current in the power switch being reduced to virtually zero at a voltage that is predetermined by the component.

The power switch advantageously has (virtually) no component for reducing the ambipolar charge carrier life (life time killing). The expression "ambipolar charge carrier life" should be understood as meaning that the recombination takes place exclusively between holes and electrons, that is to say without any disturbance points being involved. For this purpose, the inner zone and the field stop zone are configured such that the ambipolar charge carrier life corresponds to that of an undisturbed semiconductor body. An undisturbed semiconductor body occurs when the semiconductor body has not yet been treated and there are thus (virtually) no recombination centers in the semiconductor body.

The ambipolar charge carrier life is advantageously at least 5 μs. Typically, it is about 70 As, since the semiconductor component then has better conductivity. Prior-art power switches for the stated applications have a very much shorter ambipolar charge carrier life of about 200–300 ns. In power switches such as these, this has the disadvantage that the plasma concentration varies severely as a function of the temperature.

Semiconductor components according to the prior art, in particular so-called punch through IGBTs (PT-IGBTs), require a major reduction in the ambipolar carrier life in order to reduce the switching losses. The reduction becomes considerably less effective as the temperature rises, due to the reduction in the catchment cross-sectional area. This results in a rise in the plasma concentration as a function of temperature, and hence a rise in the switching-off losses on switching off, owing to the considerably greater amount of charge to be removed.

The layer thickness of the field stop zone is, according to the invention, less than or equal to 30 μm. It is particularly advantageous for the layer thickness of the field stop zone to be 10–20 μm. The layer thickness of the collector zone is typically less than or equal to 5 μm, and is advantageously less than or equal to 1 μm. In prior-art power switches, this layer is used, inter alia, to stabilize the semiconductor body, and this has a layer thickness in the region above 200 μm. In the present invention, the collector zone is not used to stabilize the semiconductor body, and may thus be configured to be appropriately thin.

It is particularly advantageous for a so-called field stop IGBT to be used as the power switch, since it combines the advantages of PT and NPT-IGBTs with one another. By dispensing with life setting, no critical temperature can be observed when the temperature is raised, beyond which the flooding charge and hence the switching losses increase sharply, and beyond which the component becomes thermally unstable, which, in the extreme, could lead to destruction of the semiconductor switch. Dispensing with life setting results in the temperature coefficient of the pass voltage becoming positive, that is to say when a number of identical power switches are connected in parallel, as is the case in bridge circuits for example, the respectively hottest power switch advantageously draws the least current. However, the invention can also advantageously be used with a power switch in the form of a punch through IGBT, if, at the same time, it is more effective and more advantageous than a field stop IGBT.

One particular advantage of the present circuit configuration is that the switching power losses are virtually independent of temperature in the temperature range from −40° C. to 150° C. The losses in this case rise only by about 50–80% between the low (−40° C.) temperatures and the high (150° C.) temperatures.

In a first advantageous refinement of the invention, when the resonant circuit is switched off, it acts like a (virtually) ideal parallel resonant circuit, that is to say a parallel resonant circuit without any losses. In this case, the inductance $L_R$ and the capacitor $C_K$ are disposed in parallel with one another, while the load path of the power switch and the resonant circuit are connected in series, and are disposed between the first and the second supply potential. The elements of the parallel resonant circuit $L_R$, $C_K$ satisfy the following generally known equation:

$$\tfrac{1}{2}C_K U_{CK,max}^2 = \tfrac{1}{2}L_R I_{LR,max}^2$$

where $U_{CK,max}$ is the maximum voltage dropped across the so-called commutation capacitor $C_K$ and $I_{LR,max}$ is the maximum current flowing through the so-called resonant inductance $L_R$. When the circuit configuration is in operation, the energy that is stored in the resonant inductance $I_R$ when the maximum coil current $I_{LR,max}$ is flowing is emitted successively to the commutation capacitor $C_K$ until the maximum coil current has fallen to zero, and the maximum voltage $U_{CK,max}$ is dropped across the commutation capacitor $C_K$. The commutation capacitor $C_K$ is then discharged once again in the opposite direction, that is to say in the direction of the resonant inductance $L_R$, which itself stores the energy.

In a typical refinement of the parallel resonant circuit, the capacitor has a very much smaller capacitance than the load capacitor.

In a second advantageous refinement of the invention, the resonant circuit is in the form of a (virtually) ideal series resonant circuit. The inductance and the capacitor, which are connected in parallel with the load path of the power switch, are in this case connected in series with one another, and are disposed between the first and the second supply potential.

The invention can be used particularly advantageously in those circuit configurations that are in the form of a switch mode power supply, a clocked power supply, a voltage regulator, a lamp drive switch, or the like.

The resonant circuit typically has two operating phases. In the first operating phase, the power switch has just been switched on, and is then in the switched-on state. At the start of this phase, the power switch has not yet been switched on, and the diode current is also zero. The power switch can now be switched on via a drive signal. During the second operating phase, the power switch is switched off, and the resonant circuit is oscillating freely. The frequency of the resonant circuit is in this case typically predetermined by the elements of the resonant circuit.

The switching-on time of the power switch and hence the start of the first operating phase are advantageously freely variable. Furthermore, it is particularly advantageous for the pulse width of the circuit configuration to be adjustable over the duration of the first operating phase. For example, the pulse width can be modulated to be longer or shorter by changing the time at which the power switch is switched off. The switching-off time and hence the pulse width are advantageously predetermined by the drive circuit, where they can be programmed.

It is particularly advantageous for the collector potential and the voltage which is dropped across the power switch to be virtually zero during the first phase—that is to say corresponding to the forward voltage of the power switch—and to be approximately sinusoidal during the second phase. In this case, the attenuation, and hence the losses in the resonant circuit as well, are particularly small.

Further advantageous refinements and developments of the invention can be found in the dependent claims as well as in the description, with reference to the drawing.

Other features that are considered as characteristic for the invention are set forth in the appended claims.

Although the invention is illustrated and described herein as embodied in a circuit configuration for off-load switching, a switch mode power supply, a clocked supply, a voltage regulator, a lamp switch, and methods for operating the circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
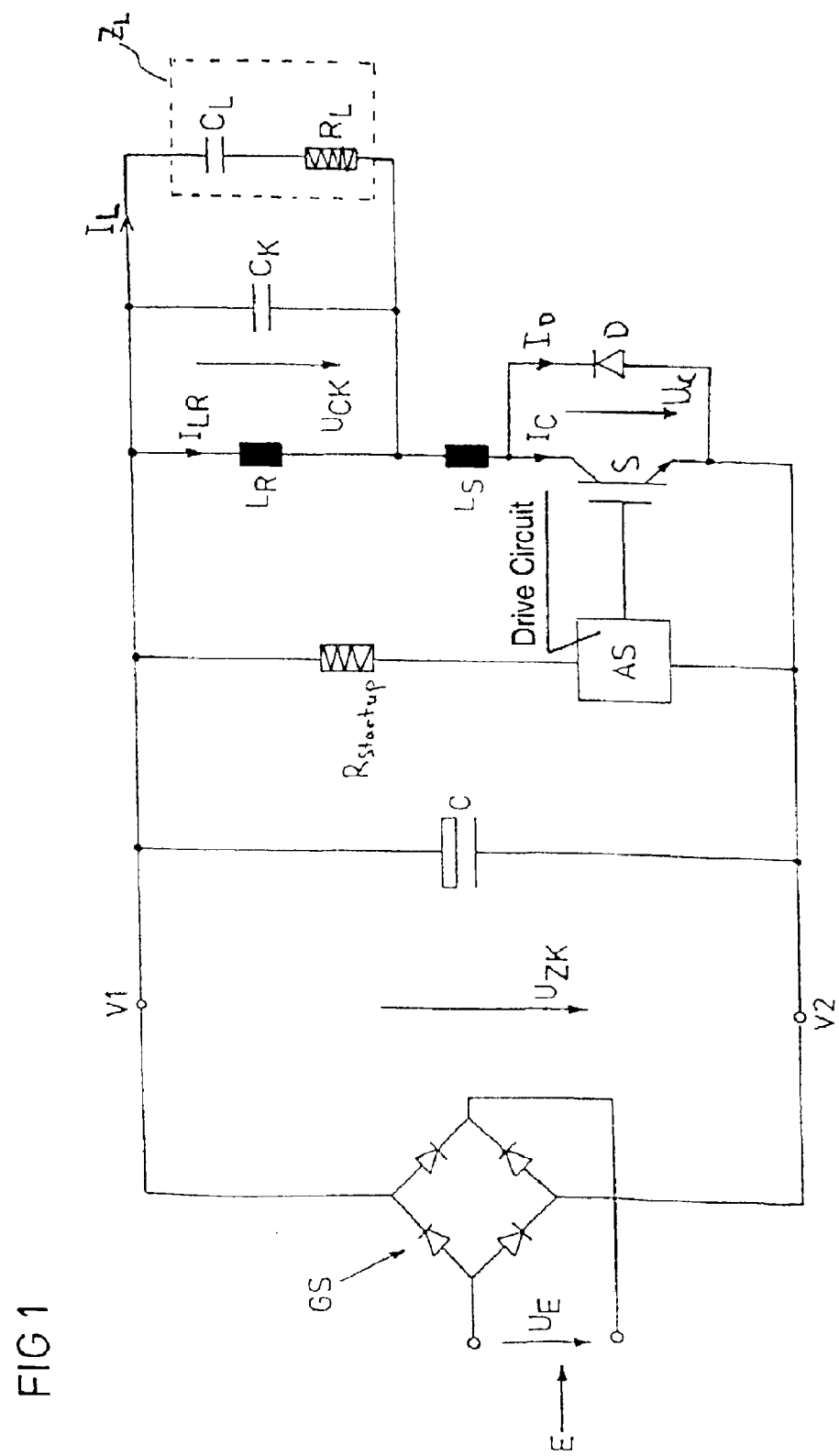
FIG. 1 is a circuit diagram showing a first exemplary embodiment of a circuit configuration according to the invention, which is in the form of a lamp drive circuit with an attenuating element.

In all the figures of the drawing, sub-features and integral parts that correspond to one another bear the same reference symbol in each case, unless stated to the contrary.

Referring now to the figures of the drawings in detail and first, particularly to FIG. 1 thereof, there is shown a first exemplary embodiment of a circuit configuration according to the invention. The circuit configuration in FIG. 1 shows a lamp drive with an attenuating element. The attenuating element is in the form of a parallel resonant circuit.

The circuit has an input E to which an input voltage $U_E$, for example a mains voltage, is applied. The input voltage $U_E$ is supplied to a rectifier circuit GS, whose output provides two rectified supply potentials V1, V2, and hence an intermediate circuit voltage $U_{ZK}$=V2−V1. An energy storage capacitor C, which in the present exemplary embodiment is in the form of an electrolytic capacitor, is connected between these supply potentials V1, V2, and forms the intermediate circuit of the circuit configuration.

A controllable power switch S is disposed in parallel with the electrolytic capacitor C, and likewise between the potentials V1, V2. According to the invention, the controllable power switch is an IGBT (Insulated Gate Bipolar Transistor). The construction and method of operation of an IGBT will be described more comprehensively with reference to FIG. 6 in the following text. A freewheeling diode D is provided in parallel with the load path of the power switch S, that is to say between its collector and emitter connections. The IGBT is driven by a drive circuit AS, which is likewise connected between the potentials V1, V2. The so-called start-up resistor $R_{START-UP}$ is typically disposed between the drive circuit AS and the connection for the potential V1. The start-up resistor $R_{START-UP}$ supplies the drive circuit AS, which does not draw any power when in the switched-off state or in the power-down mode, with the necessary electrical power immediately on being switched on. Alternatively, it would also be feasible here to couple the drive circuit AS to a current source, a drive circuit AS with a current source, for example an MOS transistor, or to supply with power via a low-voltage tap between the switch S and the inductance $L_R$.

An ideal resonant circuit $L_R$, $C_K$, that is to say a resonant circuit whose losses are as low as possible, is connected in series with the load path of the power switch S. The resonant circuit $L_R$, $C_K$ includes the parallel circuit formed by an inductance $L_R$ and a capacitor $C_K$, and is used for supplying the energy which is stored in the resonant circuit inductance $L_R$ successively to the resonant circuit capacitor $C_K$ when the circuit configuration is switched off, so that the stored energy is consumed.

An actual circuit configuration furthermore typically has a parasitic stray inductance $L_S$, which is disposed between the load path of the power switch S and the resonant circuit LR, $C_K$, and which should as far as possible be avoided—for example by short connecting lines.

A load $Z_L$ is provided at the output of the circuit configuration, that is to say in parallel with the resonant circuit $L_R$, $C_k$. The load $Z_L$ in the present exemplary embodiment includes a series-connected load capacitor $C_L$ and a load resistor $R_L$. The load resistor $R_L$ and the load capacitor $C_L$ symbolize the losses in a load, for example in a lamp. The capacitance of the load capacitor $C_L$ is typically very much greater than that of the resonant circuit capacitor $C_K$, and this needs to be taken into account when deciding on the size of the resonant circuit capacitor $C_K$, as is described in the following text.

Figure 2:
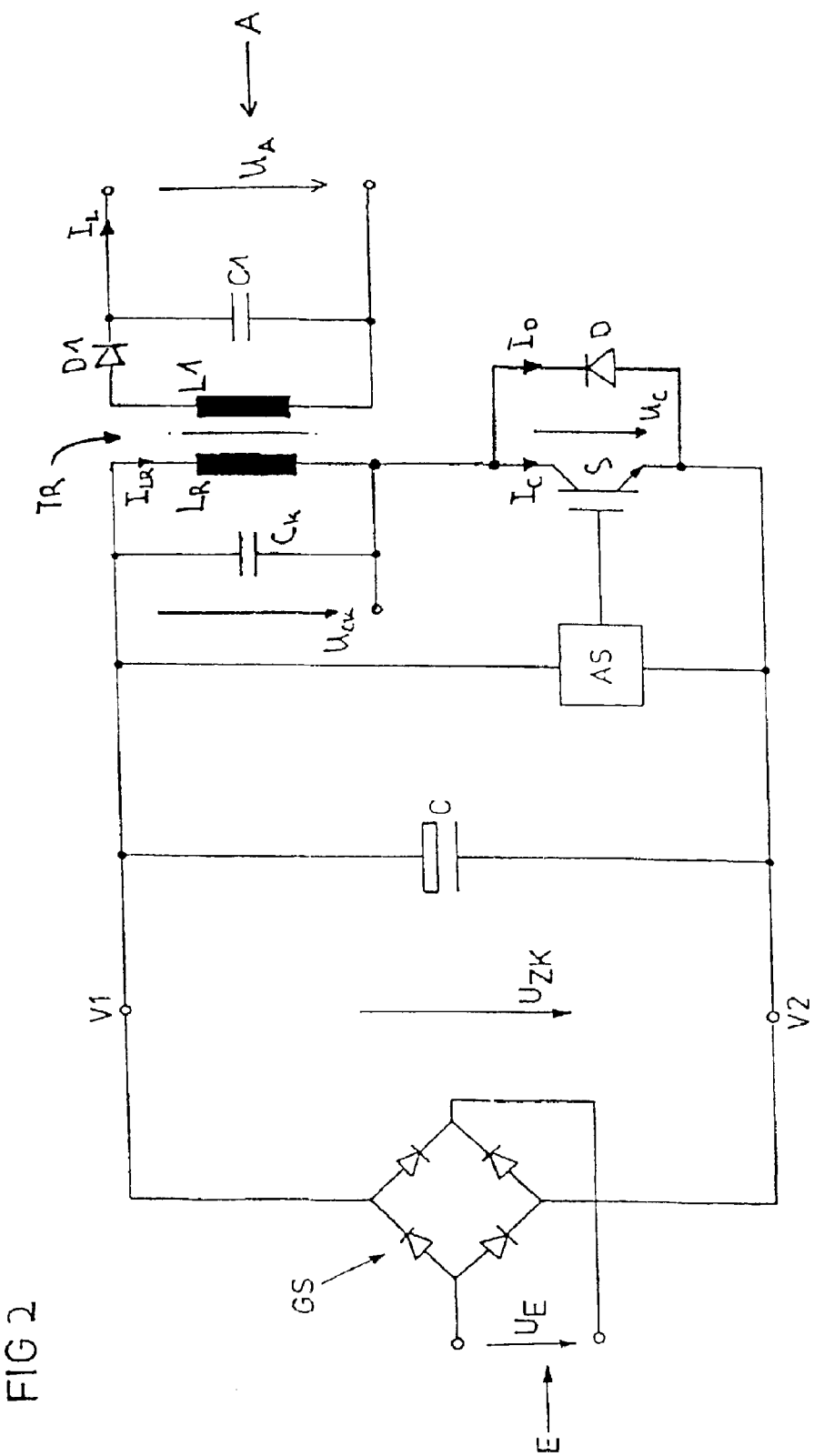
FIG. 2 is a circuit diagram showing a second exemplary embodiment of a circuit configuration according to the invention, which is in the form of a switch mode power supply with inductive coupling.

FIG. 2 shows a second exemplary embodiment of a circuit configuration according to the invention, which is in this case in the form of a switch mode power supply with inductive coupling. In comparison to the circuit configuration shown in FIG. 1, the circuit configuration in FIG. 2 has been illustrated in simplified form, that is to say the parasitic stray inductance $L_S$, the load $Z_L$ and the start-up resistor $R_{START-UP}$ have not been illustrated here. The inductance $L_R$ of the parallel resonant circuit in this case at the same time forms the primary-side inductance of a transformer TR. The transformer TR furthermore has a secondary-side inductance L1 as well as a diode D1 connected in series with it. A buffer capacitor C1 is provided in parallel with the series circuit formed by the diode D1 and the inductance L1, and thus in parallel with the output A of the circuit configuration, at which the output voltage $U_A$ can be tapped off.

The method of operation of the circuit configurations according to the invention will be described in more detail in the following text with reference to FIG. 3, in a corresponding way to FIGS. 1 and 2. The basic method of operation of a lamp drive circuit and of a switch mode power supply will not be described here since these are generally assumed to be known by those skilled in the art. The description will cover only the interaction of the currents and voltages in the parallel resonant circuit and the power switch S, as well as the diode D connected in parallel with it.

FIG. 3A shows the time voltage profile of the voltage $U_{CK}$ (solid line) which is dropped across the inductance LR, and the voltage $U_C$ (dashed line) which is dropped across the switch S. FIG. 3B shows the time profile of the currents, with the solid curve in this case showing the current $I_{LR}$ through the inductance $L_R$, the dashed curve showing the current $I_C$ at the collector of the power switch S, and the dotted line showing the diode current $I_D$ through the diode D.

The current and voltage profiles can be roughly subdivided into two different phases I, II, with I denoting the switching-on phase of the power switch S, during which it has just been switched on, and is subsequently in the switched-on state. II denotes the phase in which the power switch S is switched off, so that the resonant circuit can oscillate freely.

In phase I, the inductance current $I_{LR}$ rises linearly and continuously. In this case, the coil voltage $U_{CK}$ is at a high level ($U_{CK, 0}$), while the voltage $U_C$ which is dropped across the power switch S is virtually zero. If the power switch S is switched off at a time t1, then the voltage $U_C$ which is dropped across the power switch rises slowly, while the coil voltage $U_{CK}$ falls to an equal extent. The switching-off process results in the collector current $I_C$ through the power switch S collapsing to zero, while the coil current $I_{LR}$ still continues to rise for some time, but with an increasingly flatter profile. This so-called overshooting of the coil current $I_{LR}$ is caused by the parallel circuit formed by the inductance $L_R$ and the capacitor $C_K$. On switching off, the capacitor $C_K$ is furthermore discharged via the inductance $L_R$, which produces a coil current $I_{LR}$, and hence an overshoot. In practice, the collector current $I_C$ does not immediately decrease to zero, but runs with a smooth profile toward zero. This is referred to as a tail current, which is caused by a current flow, due to depletion processes, after the power switch S has been switched off.

At the time t2, the coil voltage $U_{CK}$ becomes negative and ideally has the profile of a negative half-cycle of an approximately sinusoidal curve, which becomes positive again at the time t3. The coil current $I_{LR}$ decreases, and even becomes negative, between the times t2 and t3. In the same time period, the voltage $U_C$ which is dropped across the power switch S rises, with the voltage profile ideally being equivalent to that of a positive sinusoidal half-cycle. However, in reality, the sinusoidal curve has an exponential function superimposed on it, since the load typically creates damping, which is not negligible. In particular, loads that are in the form of lamps, in particular gas discharge lamps, have very high damping, so that the sinusoidal curve is heavily distorted.

After the time t4, the charge on the gate capacitance of the power switch S is slowly reversed. At the time t4, the coil voltage reaches the applied intermediate circuit voltage. The voltage across the switch is zero. The free oscillation of the resonant circuit ends at this time t4, since the diode is forward-biased even at a small voltage, and carries the coil current. The coil current $I_{LR}$ now rises linearly once again. The magnitude of the diode current $I_D$ which was zero until now, rises abruptly at the time t4, and becomes highly negative. The diode current $I_D$ initially carries the entire coil current $I_{LR}$ after the time t4. The coil current $I_{LR}$ and the reverse current $I_D$ through the diode D are still negative at this time, since the power switch S has not yet been switched on. At the time t5, the coil current changes its mathematical sign, and the power switch S is already switched on. The diode current $I_D$ tends to zero at the same time, and the collector current $I_C$ through the power switch S carries the entire coil current $I_{LR}$, rising continuously and linearly to the time at which the power switch S is switched off again.

The switched-on phase I is thus subdivided into a first switching area Ia, during which the diode D is forward-biased, and a second switching area IIa, in which the power switch S is switched on. The actual switching-on time of the power switch S is in this case freely variable within the time interval t5–t4. The significant feature is that, at the switching-on time, [lacuna] and the voltage across the power switch S should be zero. The switching-on time is thus virtually freely variable in the time interval t5–t4. However, in order to allow the power switch S to be switched on in a defined manner, the diode current $I_D$ should thus be as small as possible, that is to say the switching-on time t5 is ideally the same as t4. However, the interval t5–t4 should equally be sufficiently long to ensure that the power switch S is always switched on in a defined manner.

The switching-off time t1 governs the magnitude of the reverse current $I_D$ through the diode D and is highly dependent on the dimensions of the load. During the free oscillation of the resonant circuit, that is to say during the time interval t4–t1, the frequency is governed by the resonant circuit itself.

The pulse width of the circuit configuration can be varied via the switching-on and switching-off times t4, t1.

The difference between the maximum and minimum current $I_{LR}$ is a measure of the power consumed by the load.

Figure 4:
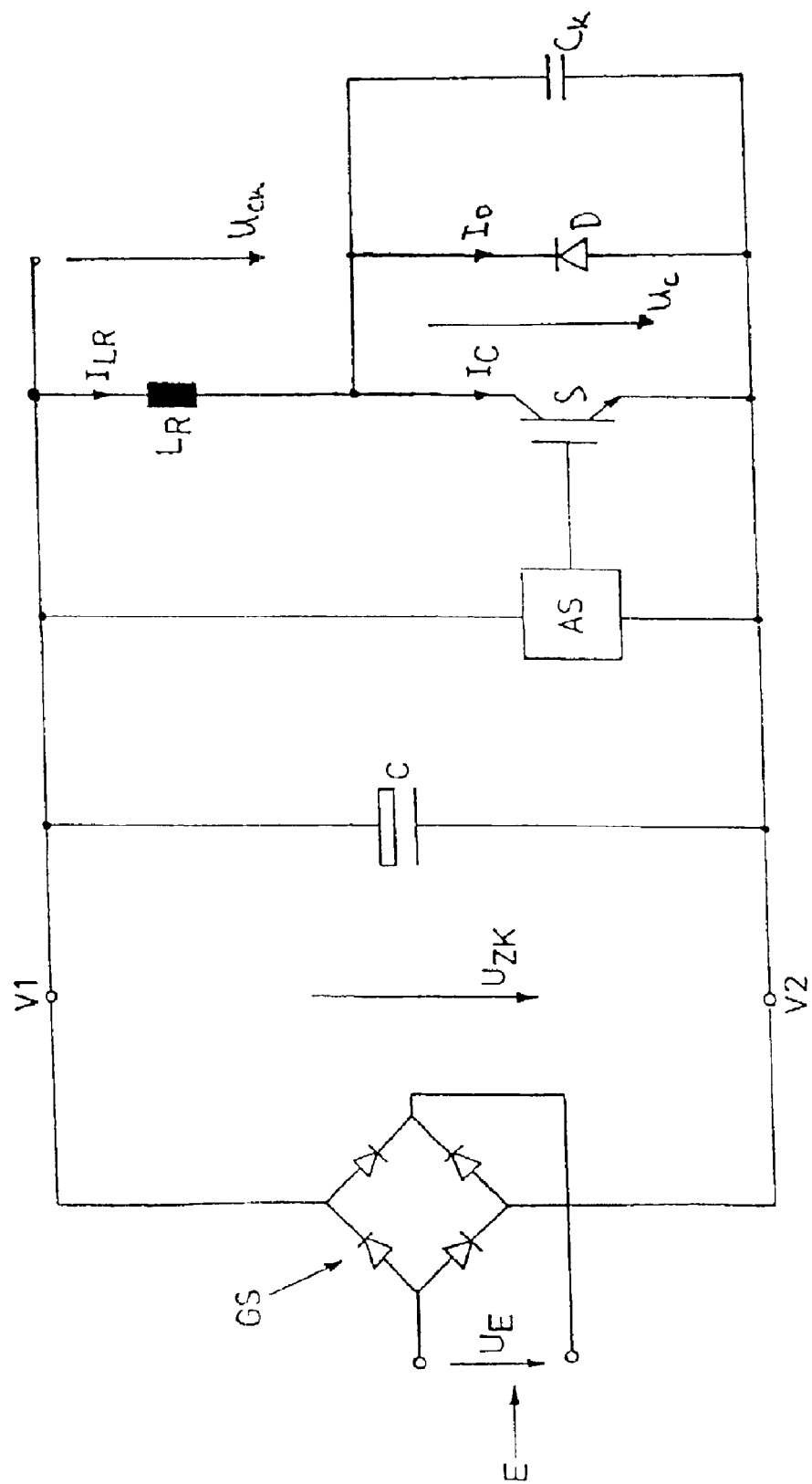
FIG. 4 is a circuit diagram showing a third exemplary embodiment of a circuit configuration according to the invention.

FIG. 4 shows a fourth exemplary embodiment of a circuit configuration according to the invention, which is in the form of a drive circuit for a television load. As a modification to the exemplary embodiments shown in FIGS. 1 and 2, the resonant circuit is in this case in the form of a series resonant circuit. The capacitor $C_K$ is in this case connected in parallel with the diode D and with the load path of the power switch S. This parallel circuit is connected in series with the inductance $L_R$.

Figure 3:
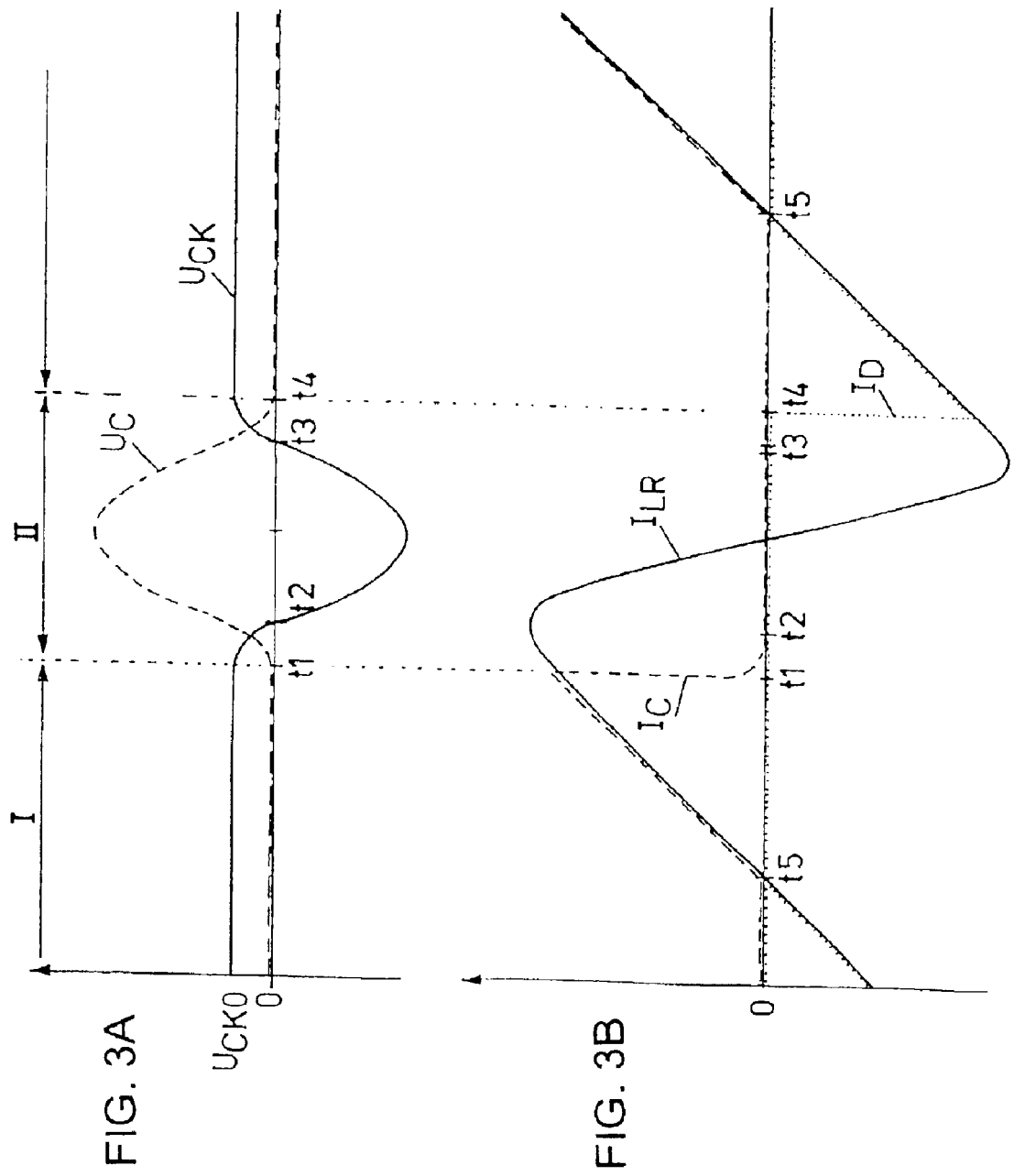
FIGS. 3A and 3B are graphs plotting currents and voltages versus time on common x-axis for the circuit configurations shown in FIGS. 1 and 2.

The current/voltage profiles of a circuit configuration as shown in FIG. 4 correspond essentially to the profiles illustrated in FIG. 3. In this case, the voltage $U_{CK}$ is dropped across the inductance $L_R$. The only difference is due to the fact that the coil current $I_{LR}$ does not overshoot after the power switch S has been switched off, since the capacitor $C_K$ can no longer be discharged via the inductance $L_R$. The coil current $I_{LR}$ thus decreases successively and immediately, that is to say from the time t1 itself. However, the capacitor C must, of course, first have been charged to the voltage $U_{CK,0}$.

Figure 5:
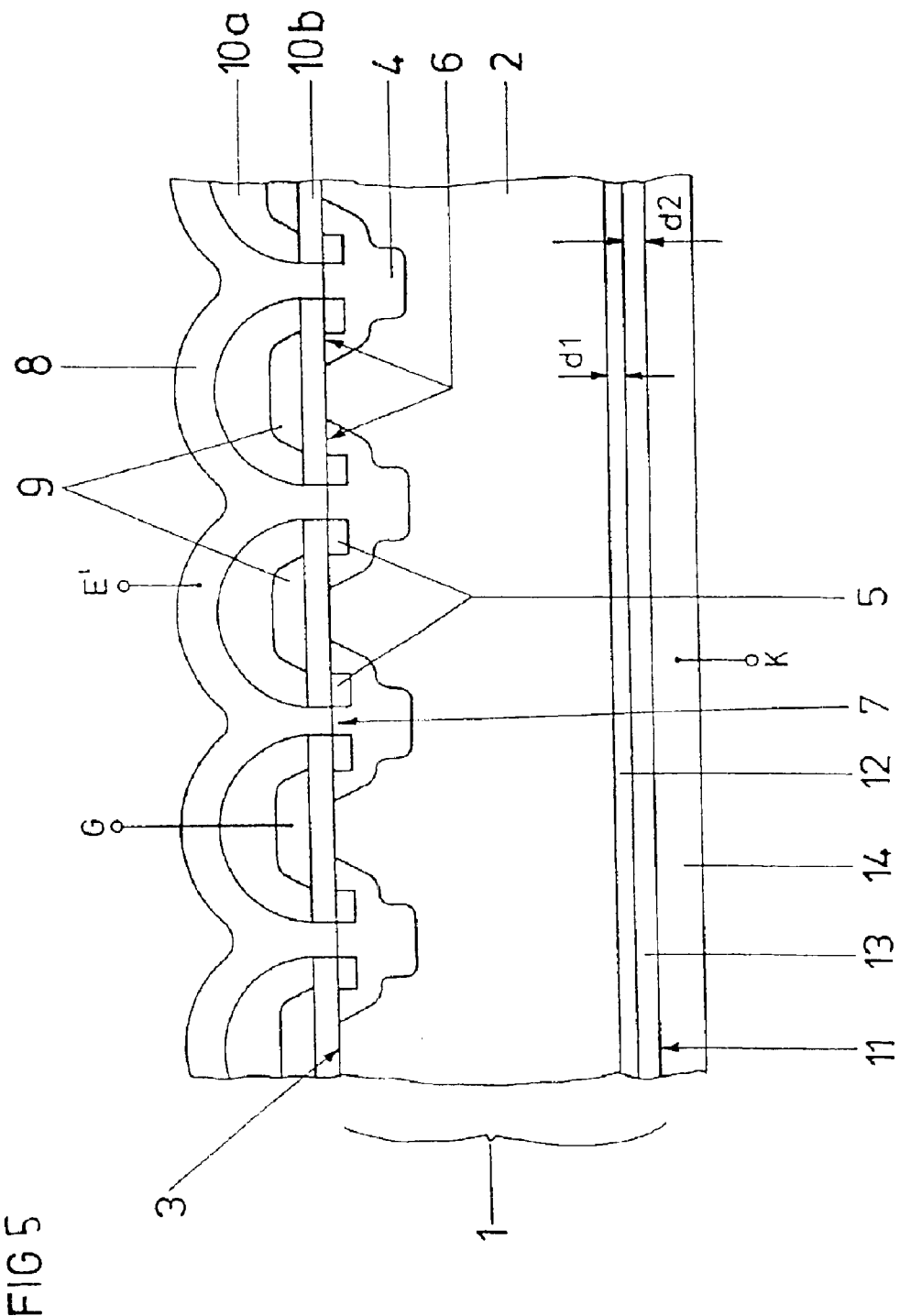
FIG. 5 is a diagrammatic sectional view of an optimized power switch in the form of a field stop IGBT.

The following text describes in more detail the construction of a power switch S according to the invention, in the form of an IGBT, corresponding to FIGS. 1, 2 and 4 on the basis of the subsection in FIG. 5.

The IGBT power switch S illustrated in FIG. 5 is disposed in a semiconductor body 1—for example composed of silicon. The semiconductor body 1 has an n-doped inner zone 2. On the first surface 3, a p⁺-doped base zone 4 is embedded in the inner zone 2. At least one n⁺-doped emitter zone 5 is also in turn embedded in each base zone 4 in such a way that the base zones 4 appear at the surface 3 of the semiconductor body 1 at various points 6, 7, and are covered by the emitter zones 5 in the other areas. These points 6, 7 which appear on the surface 3 are, firstly, the channel zones 6 and the contact areas 7 which are each connected to one emitter electrode 8. A gate electrode 9 is also provided for controlling the channel zone 6, which is separated and isolated from the emitter electrode 8 via an oxide 10a, and is separated and isolated from the semiconductor body 1, in the area of the channel zone 6, via a dielectric 10b. The gate electrode 9 is disposed above the semiconductor body 1 in such a way that at least that area of the channel zone 6 which appears on the surface 3 of the base zone 4 is covered by the gate electrode 9.

On the rear face of the semiconductor body 1, an n-doped field stop zone 12, a large area of which is adjacent the inner zone 2, and a p⁺-doped collector zone 13, which is adjacent the field stop zone 12, are first of all provided between a second surface 11 and the inner zone 2. The collector zone 13 makes contact over a large area with a collector electrode 14 on the second surface 11.

FIG. 5 thus shows a vertical semiconductor component that is in the form of a field stop IGBT and in which the gate electrode 9 together with a gate connection G and the emitter electrode 8 together with an emitter connection E' are disposed on the (wafer) front face 3 of the semiconductor body 1 and, on the (wafer) rear face 11, the collector electrode 14 is connected to the collector connection K. The charge carriers flowing through the channel zone 6 initially flow through the inner zone 2 into the field stop zone 12 and the collector zone 13, where they are sucked away by the collector electrode 14. The collector zone 13 is used for injection of minority charge carriers into the inner zone 2, and hence to increase the conductivity when the semiconductor component is switched on.

The gate electrode 9 is typically made of highly-doped polysilicon, but can also be provided as a conventional metallization or as a silicide. The source electrode 8 and the drain electrode 14 are in the form of conventional metallization, for example being composed of aluminum, copper, gold etc. The dielectric 10b between the gate electrode 9 and the semiconductor body 1 as well as the oxide 10a typically contain silicon dioxide ($SiO_2$) but, of course, may also be formed by some other material, such as silicon nitride ($Si_3N_4$), or from a mixture of the stated materials.

Further exemplary embodiments can, of course, be produced for the exemplary embodiment shown in FIG. 5 by interchanging all the conductance types n and p, and by variation of the doping concentrations. Furthermore, FIG. 5 shows an IGBT in the form of a D-MOS, although this semiconductor component could also be replaced by a V-shaped [lacuna] a trench IGBT or the like.

A field stop IGBT corresponding to that in FIG. 5 is distinguished in comparison to other IGBT variants, such as a PT-IGBT (Punch Through IGBT) in that the collector zone 13 and the field stop zone 12 are very thin; these zones 12, 13 typically have a layer thickness d1, d2 of between 100 nm and 30 μm. In contrast to this, the field stop zone 12 and the collector zone 13 in a PT-IGBT are considerably larger than 30 μm. The essential feature for the size of the field stop zone 12 and collector zone 13 in this context is that they must have a very high doping concentration. In particular, the field stop zone 12 should have a doping concentration that is several orders of magnitude higher than that of the inner zone 2.

The particular advantage of the field stop IGBT shown in FIG. 5 in comparison to a conventional PT-IGBT is its lower emitter efficiency in the situation where the collector zone 13 has the described thickness d2<5 μm. In this case, a short life reduction, or even no life reduction is required, so that the field stop zone 12 can advantageously likewise be constructed to be very thin (d1<5 μm). Since, as already mentioned in the introduction, this life setting is highly temperature-dependent, the provision of a field stop IGBT advantageously means that the power loss is only slightly dependent on temperature, or is even not dependent on temperature at all. A field stop IGBT is thus particularly highly suitable for the circuits which are shown in FIGS. 1, 2 and 4 and switch when there is no voltage load, because they can be operated with a very high reverse voltage with very low power losses and, furthermore, the power loss is also virtually independent of temperature.

The construction of a field stop IGBT as shown in FIG. 5 is described, by way of example, in German Patent No. DE 197 31 495 C2, which corresponds to U.S. Pat. No. 6,309,920. With regard to further details, features, their advantages and the method of operation of a field stop IGBT, express reference is made to the German Patent DE 197 31 495 C2, whose full contents are incorporated by reference.

PT-IGBTs could, of course, also be used in addition to the described field stop IGBTs for a circuit configuration for no-load switching, that is to say switching with no voltage applied, as shown in FIGS. 1, 2, and 4. PT-IGBTs are particularly suitable for circuits in which there is no voltage load since, even at very high voltages, they have considerably lower power losses than the initially mentioned MOSFETs. However, the problem with PT-IGBTs is their high emitter efficiency, and the plasma flooding in the inner zone associated with this. The charge carrier life must be reduced in order to reduce the charge carrier flooding. This reduction in the charge carrier life is set by suitable construction of the field stop zone, in particular by its doping concentration and layer thickness. However, the reduction in the charge carrier life in the field stop zone is highly temperature-dependent, so that the switching power losses in PT-IGBTs rise sharply as the temperature rises.

Finally, a so-called NPT-IGBT (Non Punch Through IGBT) could also be used as the power switch S. The construction of an NPT-IGBT and of a PT-IGBT is described in detail in Jens Peer Stengl, Jenö Tihanyi, "Leistungs-MOS-FET-Praxis" [Power MOSFET practice], Pflaum Verlag, Munich, 1992. An NPT-IGBT such as this dispenses entirely with life settings and, in consequence, its switching power losses are only slightly dependent on the temperature. As in the case of an FS-IGBT, the flooding charge is in this case removed by the voltage applied between the emitter and the collector. An NPT-IGBT is thus suitable only to a restricted extent for switching conditions in which there is no voltage load.

The vertical structure, which differs from that in a PT-IGBT or FS-IGBT, with a thicker inner zone and with the field stop zone 12 being dispensed with entirely results in a field distribution in the switch such that the flooding charge is removed only at voltages which are in the area of the breakdown voltage. In the case of PT- and FS-IGBTs, the majority of the plasma charge is removed as soon as the field stop zone 11 collapses due to the applied voltage for the electrical field. This is typically the case at voltages below the breakdown voltage. In PT-IGBTs and FS-IGBTs, the electrical field reaches the field stop zone even at low collector-emitter voltages owing to the n-doped layer in front of the rear face. The plasma is thus removed even at low voltage, so that no current flow occurs at high voltages. Semiconductor components such as these are distinguished by particularly low losses during switching when there is no voltage load.

In the case of NPT-IGBTs, on the other hand, the electrical field does not reach the emitter area on the rear face of the semiconductor body even at a specified breakdown voltage, so that a tail current occurs even at high voltages. The losses during switching when there is no voltage load are thus considerably higher than in the semiconductor components described above.

Figure 6B:
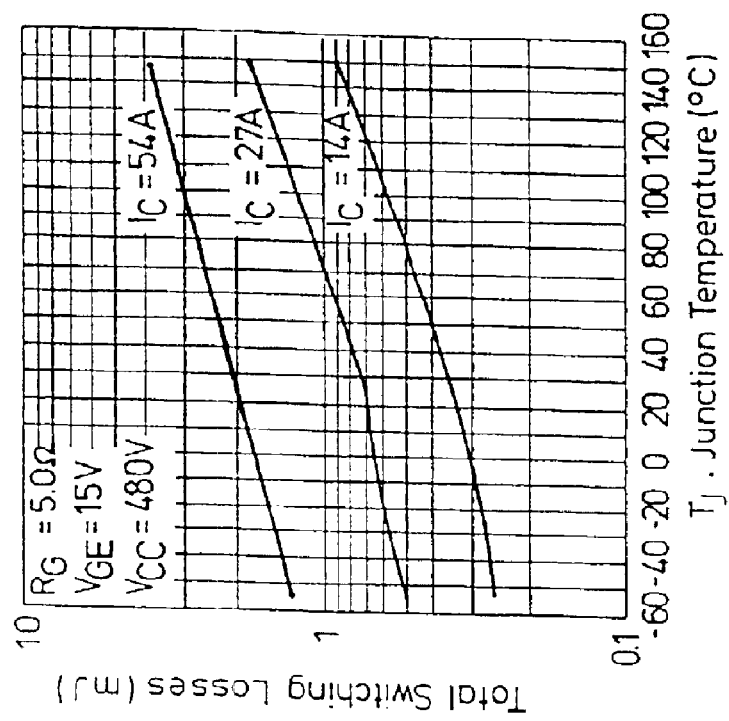
FIGS. 6A and 6B are graphs showing the temperature dependency of the switching losses in a field stop IGBT (A) and in a PT-IGBT (B)
Figure 6A:
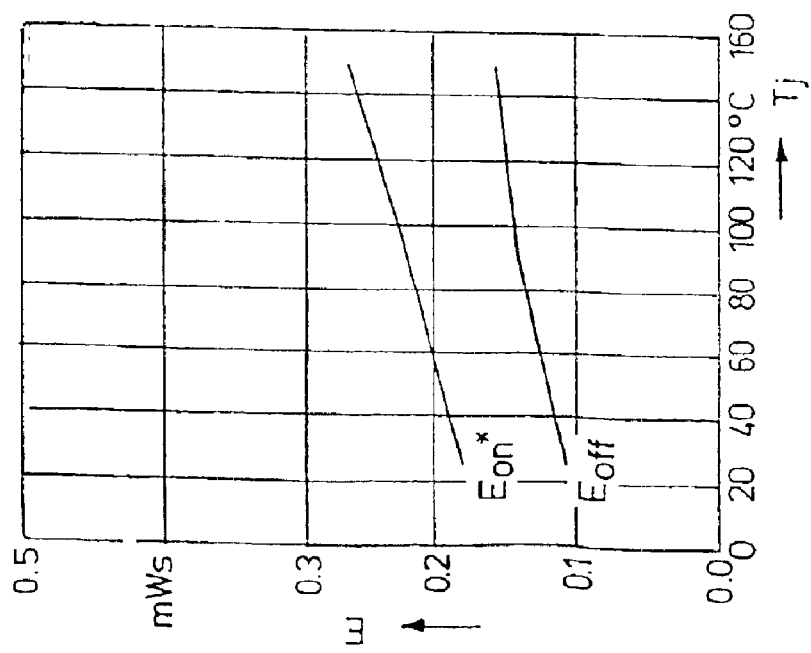

FIG. 6 uses a graph to show the temperature dependency of the switching losses in a field stop IGBT (A) and in a PT-IGBT (B). The graph in FIG. 6A shows that the switching-on power loss EON and the switching-off power loss $E_{OFF}$ each rise by about 50% in the temperature range $T_J$=20°–140° C. In contrast to this, the switching power loss in a PT-IGBT as shown in the graph in FIG. 6B, in which the measured values are plotted in logarithmic form, rises by about three times the temperature range between 20° and 140° C.

Figure 7A:
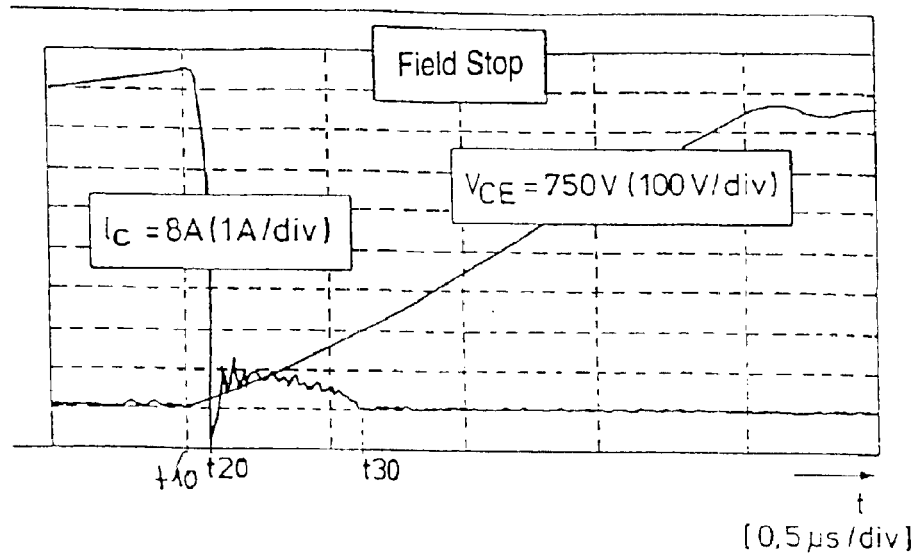
FIGS. 7A and 7B are graphs showing the dependency of the current and voltage profiles when switching off a power switch, using the example of a field stop IGBT (A) and of an NPT-IGBT (B), in conditions in which there is no voltage load.
Figure 7B:
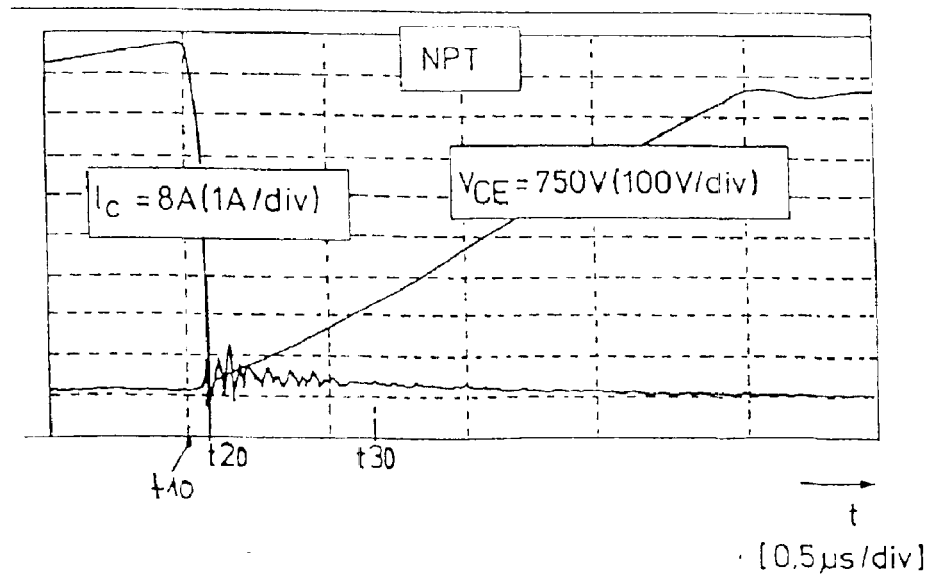

FIG. 7 uses a graph to show the dependency of the current and voltage profile when switching off a power switch using the example of a field stop IGBT (A) and of an NPT-IGBT (B) in conditions when there is no load.

In the case of the field stop IGBT and in the case of the NPT-IGBT, the collector/emitter voltage $U_C$ rises linearly when switching off at the time t10. Equally, the collector current $I_C$ falls, until it has fallen virtually to zero at the time t20. The collector current $I_C$ then rises slightly once again owing to capacitor discharges (tail current), before finally tending to zero once again. In the case of a field stop IGBT, the collector current $I_C$ reaches this state in which no current flows very quickly, that is to say at the time t30. In this case, the tail current is very short, and typically ends at about 200 V. In contrast to this, the collector current $I_C$ in the NPT-IGBT (FIG. 7B) has a considerably greater current value—about 10 to 20 times higher—at the time t30, which corresponds to a considerably greater power loss. In this case, the tail current lasts for a very long time and extends to the maximum voltage.

Although the PT-IGBT has a current and voltage profile similar to that of the field stop IGBT, it is highly temperature-dependent, however.

In principle, it can thus be stated that, owing to the fact that the switching power losses in PT-IGBTs are dependent to a very much greater extent on the temperature than in the case of field stop IGBTs, PT-IGBTs are particularly suitable for those applications in which the semiconductor components are subject to only minor temperature fluctuations, although the voltage is high. In contrast to this, field stop IGBTs, which have all the advantages of PT-IGBTs and NPT-IGBTs and, furthermore, whose switching power losses are virtually independent of temperature, are thus the optimum solution for the use according to the invention as a power switch in a circuit configuration as shown in FIGS. 1, 2, and 4.

The invention is particularly suitable for those circuits in which switching with no voltage is advantageous, such as switch mode power supplies, half-bridge or full-bridge circuits, rectifier or inverter circuits, voltage regulators, power supplies, lamp drive circuits, and the like.

In summary, it can be stated that the field stop IGBT and PT-IGBT constructed and operated as described provide a semiconductor component which is optimized for the purpose of switching when there is no voltage load, without at the same time needing to accept the disadvantages of semiconductor components, in the form of MOSFETS, according to the prior art. In particular, if the power switch is in the form of a field stop IGBT, the power switch is especially also suitable for operation at high temperatures since, in this case, the switching power losses are not significantly dependent on the temperature.

The present invention has been explained in the above description in order to explain as well as possible the principle of the invention and its practical use. The present invention also, of course, can be implemented in a suitable manner in many different embodiments and modified forms within the scope of specialist craft and knowledge.

We claim:

1. A circuit configuration for off-load switching, comprising:
    an energy storage capacitor disposed between first and second supply potentials;
    a controllable power switch connected in parallel with said energy storage capacitor and having a load path;
    a diode connected back-to-back in parallel with said load path of said power switch;
    a resonant circuit connected in series with said load path of said power switch and having a conductance and a capacitor;
    a semiconductor body holding said power switch and having a first surface, an inner zone of a first conductance type, a base zone of a second conductance type embedded in said inner zone and adjacent said first surface of said semiconductor body, an emitter zone of said first conductance type disposed in said base zone, a field stop zone of said first conductance type adjacent said inner zone and having a higher doping concentration than said inner zone, and a collector zone of said second conductance type adjacent said field stop zone.

2. The circuit configuration according to claim 1, further comprising a plurality of base zones, each of said base zones having a respective emitter zone.

3. The circuit configuration according to claim 1, wherein said inner zone and said field stop zone cause an ambipolar charge carrier life therein to correspond to an ambipolar charge carrier life of an undisturbed semiconductor body.

4. The circuit configuration according to claim 3, wherein said ambipolar charge carrier life is at least 5 $\mu s$.

5. The circuit configuration according to claim 1, wherein said field stop zone has a layer thickness of at most 30 $\mu m$.

6. The circuit configuration according to claim 5, wherein said layer thickness of said field stop zone is at most 10 $\mu m$.

7. The circuit configuration according to claim 6, wherein said layer thickness of said field stop zone is at most 1 $\mu m$.

8. The circuit configuration according to claim 1, wherein said collector zone has a layer thickness of at most 5 $\mu m$.

9. The circuit configuration according to claim 8, wherein said layer thickness of said collector zone is at most 1 $\mu m$.

10. The circuit configuration according to claim 1, wherein said power switch is a field stop IGBT.

11. The circuit configuration according to claim 1, wherein said power switch is a punch through IGBT.

12. The circuit configuration according to claim 1, wherein a switching power loss is virtually independent of, or are only slightly dependent on temperature when the temperature is ranging between $-40°$ C. and $150°$ C.

13. The circuit configuration according to claim 1, wherein:
    said resonant circuit is a parallel resonant circuit with said inductance and said capacitor connected in parallel; and
    said load path of said power switch and said resonant circuit are connected between said first and said second supply potentials.

14. The circuit configuration according to claim 13, wherein said capacitor has less capacitance than said load capacitor.

15. The circuit configuration according to claim 1, wherein said resonant circuit is a largely ideal parallel resonant circuit, and satisfies an equation:

$$\tfrac{1}{2}C_K U_{CK,max}^2 = \tfrac{1}{2}L_R I_{LR,max}^2.$$

where $U_{CK,max}$ is a maximum voltage dropped across said capacitor, and $I_{LR,max}$ is a maximum current flowing through said inductance.

16. The circuit configuration according to claim 15, wherein said capacitor has less capacitance than said load capacitor.

17. The circuit configuration according to claim 1, wherein:
    said resonant circuit is a series resonant circuit with said inductance and said capacitor connected in series; and
    said capacitor and said load path of the power switch are connected in series, and are connected between said first and second supply potentials.

18. The circuit configuration according to claim 1, wherein said resonant circuit has first and second operating phases, said first operating phase begins when said power switch has just been switched on during and then continues when said power switch is in a switched-on state, and said second operating phase occurs when said power switch is switched off and said resonant circuit oscillating freely.

19. The circuit configuration according to claim 18, wherein a switching-on time of said power switch for starting said first operating phase is freely variable.

20. The circuit configuration according to claim 18, wherein a pulse width can be varied throughout said first operating phase.

21. The circuit configuration according to claim 20, wherein said pulse width can be programmed in said drive circuit.

22. The circuit configuration according to claim 18, wherein a collector potential on said power switch is zero during said first operating phase and is approximately sinusoidal during said second operating phase.

23. A method for operating a circuit configuration according to claim 18, which comprises modulating power for a load by changing during the first operating phase at least one of a number of pulses, a pulse width, and an interval between two pulses.

24. A method for operating a circuit configuration according to claim 18, which comprises modulating power for a load by changing a switching-on time of the power switch within the first operating phase.

25. The method for operating a circuit configuration according to claim 18, which comprises:
    in a first operating mode, modulating power for a load by changing during the first operating phase at least one of a number of pulses, a pulse width, and an interval between two pulses;
    in a second operating mode, modulating the power for the load by changing a switching-on time of the power switch within the first operating phase; and
    in a third operating mode, modulating the power provided for the load both by changing the switching-on time of the power switch within the first operating phase and by changing during the first operating phase at least one of a number of pulses, pulse width, and an interval between two pulses.

26. The circuit configuration according to claim 1, wherein said energy storage capacitor is only one energy storage capacitor disposed between said first and second supply potentials.

27. A switch mode power supply, comprising:
    a circuit configuration for off-load switching, including:
        an energy storage capacitor disposed between first and second supply potentials;

a controllable power switch connected in parallel with said energy storage capacitor and having a load path;

a diode connected back-to-back in parallel with said load path of said power switch;

a resonant circuit connected in series with said load path of said power switch and having a conductance and a capacitor;

a semiconductor body holding said power switch and having a first surface, an inner zone of a first conductance type, a base zone of a second conductance type embedded in said inner zone and adjacent said first surface of said semiconductor body, an emitter zone of said first conductance type disposed in said base zone, a field stop zone of said first conductance type adjacent said inner zone and having a higher doping concentration than said inner zone, and a collector zone of said second conductance type adjacent said field stop zone.

28. The circuit configuration according to claim 27, wherein said energy storage capacitor is only one energy storage capacitor disposed between said first and second supply potentials.

29. A clocked supply, comprising:

a circuit configuration for off-load switching, including:
an energy storage capacitor disposed between first and second supply potentials;
a controllable power switch connected in parallel with said energy storage capacitor and having a load path;
a diode connected back-to-back in parallel with said load path of said power switch;
a resonant circuit connected in series with said load path of said power switch and having a conductance and a capacitor;
a semiconductor body holding said power switch and having a first surface, an inner zone of a first conductance type, a base zone of a second conductance type embedded in said inner zone and adjacent said first surface of said semiconductor body, an emitter zone of said first conductance type disposed in said base zone, a field stop zone of said first conductance type adjacent said inner zone and having a higher doping concentration than said inner zone, and a collector zone of said second conductance type adjacent said field stop zone.

30. The circuit configuration according to claim 29, wherein said energy storage capacitor is only one energy storage capacitor disposed between said first and second supply potentials.

31. A voltage regulator, comprising:

a circuit configuration for off-load switching, including:
an energy storage capacitor disposed between first and second supply potentials;
a controllable power switch connected in parallel with said energy storage capacitor and having a load path;
a diode connected back-to-back in parallel with said load path of said power switch;
a resonant circuit connected in series with said load path of said power switch and having a conductance and a capacitor;
a semiconductor body holding said power switch and having a first surface, an inner zone of a first conductance type, a base zone of a second conductance type embedded in said inner zone and adjacent said first surface of said semiconductor body, an emitter zone of said first conductance type disposed in said base zone, a field stop zone of said first conductance type adjacent said inner zone and having a higher doping concentration than said inner zone, and a collector zone of said second conductance type adjacent said field stop zone.

32. The circuit configuration according to claim 31, wherein said energy storage capacitor is only one energy storage capacitor disposed between said first and second supply potentials.

33. A lamp drive switch, comprising:

a circuit configuration for off-load switching, including:
an energy storage capacitor disposed between first and second supply potentials;
a controllable power switch connected in parallel with said energy storage capacitor and having a load path;
a diode connected back-to-back in parallel with said load path of said power switch;
a resonant circuit connected in series with said load path of said power switch and having a conductance and a capacitor;
a semiconductor body holding said power switch and having a first surface, an inner zone of a first conductance type, a base zone of a second conductance type embedded in said inner zone and adjacent said first surface of said semiconductor body, an emitter zone of said first conductance type disposed in said base zone, a field stop zone of said first conductance type adjacent said inner zone and having a higher doping concentration than said inner zone, and a collector zone of said second conductance type adjacent said field stop zone.

34. The circuit configuration according to claim 33, wherein said energy storage capacitor is only one energy storage capacitor disposed between said first and second supply potentials.

* * * * *